United States Patent
Katayama (10) Patent No.: US 11,042,956 B2
(45) Date of Patent: Jun. 22, 2021

(54) MONITORING APPARATUS AND MONITORING METHOD

(71) Applicant: FUJITSU LIMITED, Kawasaki (JP)

(72) Inventor: Kentaro Katayama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/600,598

(22) Filed: Oct. 14, 2019

(65) Prior Publication Data

US 2020/0167888 A1  May 28, 2020

(30) Foreign Application Priority Data

Nov. 27, 2018  (JP) .............................. JP2018-221703

(51) Int. Cl.
G06T 1/20 (2006.01)
G06K 9/00 (2006.01)
H04N 7/18 (2006.01)

(52) U.S. Cl.
CPC ............ G06T 1/20 (2013.01); G06K 9/00785 (2013.01); H04N 7/181 (2013.01); G06T 2200/28 (2013.01)

(58) Field of Classification Search
CPC ... G06T 1/20; G06T 2200/28; G06K 9/00785; H04N 7/181
See application file for complete search history.

(56) References Cited

U.S. PATENT DOCUMENTS

| | | | | |
|---|---|---|---|---|
| 4,893,265 A * | 1/1990 | Hirosaki | ............ | H03H 17/0292 708/313 |
| 5,193,000 A * | 3/1993 | Lipton | ................. | H04N 19/597 348/43 |
| 6,301,246 B1 * | 10/2001 | Shaffer | ............... | H04M 3/2281 370/352 |
| 2003/0202099 A1 * | 10/2003 | Nakamura | ............. | H04N 7/181 348/153 |
| 2005/0010111 A1 * | 1/2005 | Kristoffersen | ...... | G01S 7/52034 600/437 |
| 2012/0229460 A1 * | 9/2012 | Fortin | ....................... | G06T 1/20 345/419 |
| 2017/0324669 A1 * | 11/2017 | Nakatsugawa | ..... | H04L 43/0894 |
| 2018/0307520 A1 * | 10/2018 | Hyoudou | .............. | G06F 9/4856 |
| 2020/0005425 A1 * | 1/2020 | Nakazono | ............ | H04N 1/2112 |

FOREIGN PATENT DOCUMENTS

| | | |
|---|---|---|
| GB | 2359185 | 8/2001 |
| JP | 2001-14801 | 1/2001 |
| JP | 2006-94543 | 4/2006 |
| JP | 2017-4502 | 1/2017 |
| JP | 2018-88157 | 6/2018 |

* cited by examiner

*Primary Examiner* — Xuemei G Chen
(74) *Attorney, Agent, or Firm* — Fujitsu Patent Center (57) ABSTRACT

In a monitoring apparatus, a first analysis unit and a second analysis unit analyze inputted data. A first reception unit receives data of a first data stream and outputs the data of the received first data stream to the first analysis unit. A second reception unit receives data of a second data stream and outputs the data of the received second data stream to the second analysis unit. When an updating request indicating updating of the first analysis unit has been received, a control unit instructs the second reception unit to perform a sampling process on the second data stream and output data after the sampling process, and also changes an output destination of the first reception unit so that the data of the first data stream is at least partially outputted to the second analysis unit.

8 Claims, 10 Drawing Sheets

MONITORING APPARATUS AND MONITORING METHOD

CROSS-REFERENCE TO RELATED APPLICATION

This application is based upon and claims the benefit of priority of the prior Japanese Patent Application No. 2018-221703, filed on Nov. 27, 2018, the entire contents of which are incorporated herein by reference.

FIELD

The embodiments discussed herein are related to a monitoring apparatus and a monitoring method.

BACKGROUND

Monitoring systems that receive a plurality of data streams and analyze the data streams in real time are known. As one example, there is a traffic monitoring system that receives video data from a plurality of roadside monitoring cameras which take images of a road, analyzes the video data in real time, and recognizes objects such as vehicles. When the real-time analysis of data streams has a large processing load, it would be conceivable for a monitoring system to use a hardware accelerator, such as an FPGA (Field-Programmable Gate Array) or a GPU (Graphics Processing Unit), to speed up the processing.

Note that a monitoring system that records video data produced by monitoring cameras onto removable discs has been proposed. In the proposed monitoring system, video data is recorded in normal recording mode immediately after a removable disc has been replaced, and as the next replacement timing approaches, video data is recorded in an extended recording mode with a lower frame rate than normal recording mode. A detection/recognition system that uses firmware to detect a desired object in video data produced by a camera has also been proposed. The proposed detection/recognition system performs machine learning on a detection algorithm using past video data as the teaching data and updates the firmware based on the learning result.

See, for example, Japanese Laid-open Patent Publication No. 2001-14801 and Japanese Laid-open Patent Publication No. 2018-88157.

For reasons such as a change in analysis algorithm, there are times when it is desirable to change the analysis units inside a hardware accelerator while the monitoring system is still operating. As one example, it may be desirable to update the logic circuits of an analysis unit implemented inside an FPGA by changing the circuit information fetched into the FPGA and thereby dynamically reconfiguring the FPGA. However, since updating the analysis unit in charge of a certain data stream involves temporarily stopping that analysis unit, it is not possible to continue performing real-time analysis on that data stream. This means that there is the risk of a drop in monitoring accuracy of the monitoring system, such as the risk of objects appearing in the video data being missed.

To solve this problem, it would be conceivable to reserve a spare analysis unit that is not used during normal operation inside the hardware accelerator and to use this spare analysis unit to analyze a certain data stream when the analysis unit in charge of that data stream is being updated. However, providing a spare analysis unit in a hardware accelerator is disadvantageous in terms of circuit scale and cost.

SUMMARY

According to one aspect, there is provided a monitoring apparatus including: a first analysis unit and a second analysis unit that analyze inputted data; a first reception unit that receives data of a first data stream and outputs the received data of the first data stream to the first analysis unit; a second reception unit that receives data of a second data stream and outputs the received data of the second data stream to the second analysis unit; and a control unit configured to instruct, when an updating request indicating updating of the first analysis unit has been received, the second reception unit to perform a sampling process on the second data stream and output data after the sampling process, and to change an output destination of the first reception unit so that the data of the first data stream is at least partially outputted to the second analysis unit.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Several embodiments will be described below with reference to the accompanying drawings.

First Embodiment

Figure 1:
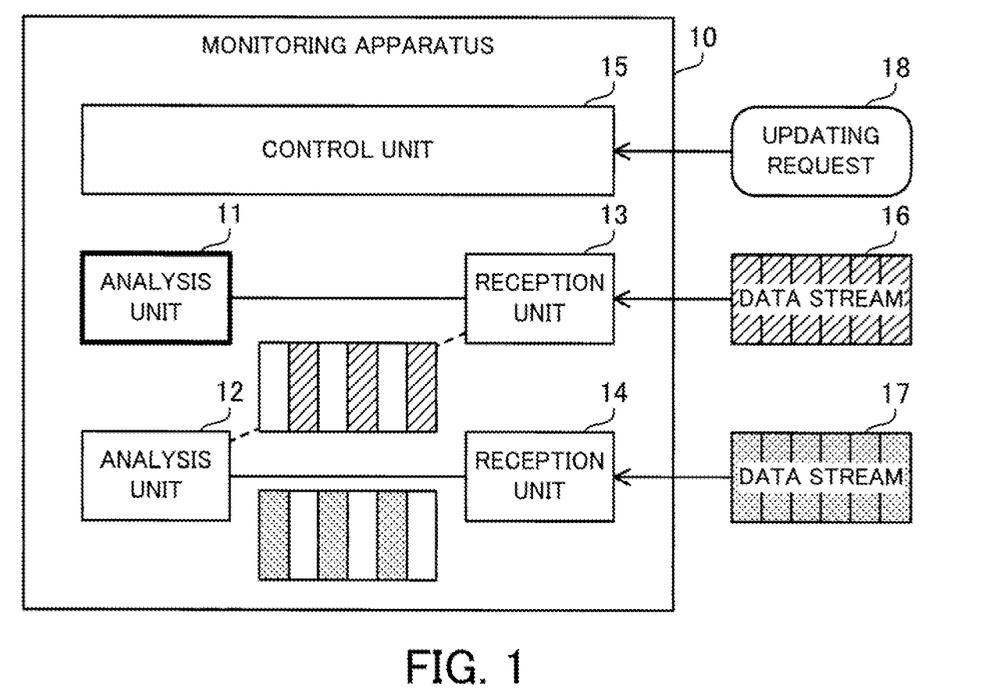
FIG. 1 depicts an example of a monitoring apparatus according to a first embodiment.

A first embodiment will now be described.
FIG. 1 depicts an example of a monitoring apparatus according to the first embodiment.

A monitoring apparatus 10 according to the first embodiment is used in a monitoring system that analyzes a plurality of data streams in real time. As one example, the monitoring apparatus 10 is used in a traffic monitoring system that analyzes a plurality of image data streams obtained by a plurality of monitoring cameras in real time and recognizes objects, such as vehicles on a road. The monitoring apparatus 10 can also be referred to as an "information processing apparatus" or a "computer". The monitoring apparatus 10 may be a client apparatus or may be a server apparatus.

The monitoring apparatus 10 includes analysis units 11 and 12, reception units 13 and 14, and a control unit 15. The monitoring apparatus 10 uses a hardware accelerator to speed up the analysis of data streams. Hardware accelerators include programmable devices, such as an FPGA, and dedicated processors, such as a GPU. As one example, the analysis units 11 and 12, the reception units 13 and 14, and the control unit 15 are implemented on the hardware accelerator.

The FPGA includes a large number of logic blocks and a wiring layer that connects the logic blocks. By providing circuit information, which indicates the wiring, inputs and outputs between logic blocks, to the FPGA and instructing the FPGA to change the configuration, it is possible to form circuit regions corresponding to the analysis units 11 and 12, the reception units 13 and 14, and the control unit 15 on the FPGA. A GPU has a large number of processor cores and a volatile shared memory that is used by the processor cores. By providing a GPU with an application program, it is possible to reserve processor cores corresponding to the analysis units 11 and 12, the reception units 13 and 14, and the control unit 15 inside the GPU.

The analysis units 11 and 12 analyze the inputted data according to a predetermined analysis algorithm. As one example, the analysis units 11 and 12 receive inputs of frames included in image data streams and perform image recognition on the inputted frames according to a predetermined image recognition algorithm. The analysis units 11 and 12 perform data analysis in real time and in parallel. A vehicle count on a road, recognition of vehicle license plates, recognition of vehicle types, and recognition of passing people can be given as example targets of image recognition.

Here, there are cases where it is desirable to update the analysis algorithm of the analysis units 11 and 12 while the operation of the monitoring apparatus 10 continues. As examples, there are cases where the analysis algorithm of the analysis units 11 and 12 is to be updated when changing the object to be monitored, when changing the monitoring location, and when the analysis algorithm has been improved. As one example, the monitoring apparatus 10 temporarily stops the analysis unit 11 and updates the analysis unit 11 while data analysis by the analysis unit 12 continues. The monitoring apparatus 10 also temporarily stops the analysis unit 12 and updates the analysis unit 12 while data analysis by the analysis unit 11 continues. When an FPGA is used, updating of the analysis units 11 and 12 can be performed by changing the wiring of some circuit regions to dynamically reconfigure the FPGA while other circuit regions are still operating. Also, when a GPU is used, the updating of the analysis units 11 and 12 can be performed by loading a new application program into some of the processor cores.

The reception units 13 and 14 each receive data of a data stream and output data of the received data stream to one of the analysis units. It is conceivable for the reception units 13 and 14 to buffer data units included in the data streams and output the data units one at a time to one of the analysis units 11 and 12 in keeping with the data analysis speed of the analysis units 11 and 12. As one example, the reception units 13 and 14 each buffer frames included in an image data stream and output frames one at a time to one of the analysis units 11 and 12 in keeping with the frame analysis speed of the analysis units 11 and 12.

The reception unit 13 continuously receives data of a data stream 16 (or "first data stream"). In normal mode, the reception unit 13 outputs data in the received data stream 16 in the received order to the analysis unit 11. The reception unit 14 continuously receives data of a data stream 17 (or "second data stream"). In normal mode, the reception unit 14 outputs data in the received data stream 17 in the received order to the analysis unit 12. That is, the analysis unit 11 corresponds to the reception unit 13 and the analysis unit 12 corresponds to the reception unit 14.

The data streams 16 and 17 are data series where data units are arranged in a time series. As one example, the data streams 16 and 17 are frame sequences in which image frames are arranged in a time series. The data streams 16 and 17 may be data series that are received from different data sources, such as different sensor devices. As one example, the data streams 16 and 17 may be frame sequences received from different monitoring cameras. The reception unit 13 is in charge of the data stream 16 and the reception unit 14 is in charge of the data stream 17. Accordingly, in normal mode, the analysis unit 11 analyzes the data stream 16 and the analysis unit 12 analyzes the data stream 17.

However, as described later, there are also times where the reception units 13 and 14 temporarily operate in sampling mode in response to an instruction from the control unit 15. In sampling mode, the analysis unit that is the output destination of received data may change. Also in sampling mode, a sampling process may be performed on the received data to delete some of the data and output only the remaining data.

The control unit 15 controls the updating of the analysis units 11 and 12. The control unit 15 receives an updating request 18 which indicates the updating of one analysis unit. In this first embodiment, updating of the analysis unit 11 is considered. The updating request 18 may be issued inside the monitoring apparatus 10 or may be received from outside the monitoring apparatus 10. The updating request 18 may be inputted by the user of the monitoring apparatus 10 or of another information processing apparatus. The updating request 18 may include identification information that identifies the analysis unit to be updated and may include information indicating the analysis algorithm to be used after updating. As one example, when an FPGA is used, the updating request 18 may include circuit information for forming a circuit region corresponding to the analysis unit 11. When a GPU is used, the updating request 18 may include an application program to be executed by the processor core corresponding to the analysis unit 11.

When the updating request 18 has been received, the control unit 15 instructs the reception unit 14 corresponding to the analysis unit 12 that is not to be updated to execute sampling mode. The sampling mode instruction is given by rewriting a parameter of the reception unit 14, for example. In sampling mode, the reception unit 14 performs a sampling process on the data stream 17 and outputs the data after sampling to the analysis unit 12. By doing so, the data to be outputted from the reception unit 14 to the analysis unit 12 per unit time is reduced. As one example, the reception unit 14 deletes frames at a predetermined ratio per fixed interval from the frames included in an image data stream.

When three or more data streams are analyzed using three or more analysis units including the analysis unit 11, the control unit 15 may instruct two or more reception units corresponding to two or more analysis units that are not to be updated to execute the sampling mode. The predetermined ratio of data to be deleted by each reception unit in sampling mode may be decided in keeping with the number of analysis units being used in the normal mode. As one example, when N (where N is an integer that is two or higher) analysis units are being used in the normal mode, it would be conceivable for the reception units corresponding to the analysis units that are not to be updated to delete 1/N data from the respective data streams. The reception unit 14 may remove one frame out of every N frames included in an image data stream. In this case, a blank interval will appear with a ratio of one in every N frames in the output from the reception unit 14 to the analysis unit 12.

When an updating request 18 is received, the control unit 15 also temporarily changes the output destination of the reception unit 13 that corresponds to the analysis unit 11 to be updated. By changing the output destination, the reception unit 13 stops the outputting of data in the data stream 16 to the analysis unit 11 and instead outputs at least part of the data in the data stream 16 to the analysis unit 12 that is not to be updated. The reception unit 13 may perform a sampling process on the data stream 16 in the same way as the reception unit 14. When an FPGA is used, the control unit 15 may add a wire between the reception unit 13 and the analysis unit 12. As one example, the control unit 15 also rewrites a parameter of the reception unit 13.

An amount of data per unit time equal to the reduction in the data outputted per unit time from the reception unit 14 to the analysis unit 12 may be outputted from the reception unit 13 to the analysis unit 12. By doing so, the data inputted into the analysis unit 12 per unit time will not increase. In blank periods where data is not outputted from the reception unit 14 to the analysis unit 12, data may be outputted from the reception unit 13 to the analysis unit 12. As one example, the reception unit 13 extracts frames at a predetermined ratio at fixed intervals from the frames included in an image data stream and outputs to the analysis unit 12.

When N analysis units are used in normal mode, it would be conceivable for the reception unit 13 to output 1/N of the data of the data stream 16 to each analysis unit that is not to be updated. As one example, when the reception unit 14 omits frames at a ratio of one in N frames, the blank period is used by the reception unit 13 to output frames at a ratio of one in N frames to the analysis unit 12.

When the updating of the analysis unit 11 is complete, the control unit 15 may exit the sampling mode and return to the normal mode. As one example, in keeping with an instruction from the control unit 15, the reception unit 13 stops outputting the data of the data stream 16 to the analysis unit 12 and instead outputs all of the data of the data stream 16 to the analysis unit 11. Also, in keeping with an instruction from the control unit 15, the reception unit 14 stops the sampling process and outputs all of the data of the data stream 17 to the analysis unit 12.

With the monitoring apparatus 10 according to the first embodiment, in keeping with the updating request 18 indicating updating of the analysis unit 11, a sampling process is performed on the data of the data stream 17 at the reception unit 14 to reduce the data to be outputted from the reception unit 14 to the analysis unit 12. The output destination of the reception unit 13 is also changed so that at least some data out of the data stream 16 is outputted to the analysis unit 12.

By doing so, even during updating of the analysis unit 11, the data of the data streams 16 and 17 is at least partially analyzed, thereby avoiding a situation where no data of the data stream 16 that the analysis unit 11 is in charge of is analyzed. Accordingly, it is possible to continue operations of the monitoring apparatus 10 even during updating of the analysis unit 11, thereby suppressing a drop in monitoring accuracy. Also, due to the sampling process performed by the reception unit 14, an increase in the load of the analysis unit 12 during the updating of the analysis unit 11 is avoided.

Accordingly, the monitoring apparatus 10 does not need a spare analysis unit and it is needless to reserve excessive processing performance for the analysis unit 12. This means that the circuit scale and cost of the monitoring apparatus 10 are suppressed. In this way, it is possible to efficiently update the analysis algorithm of the monitoring apparatus 10.

Second Embodiment

A second embodiment will now be described.

Figure 2:
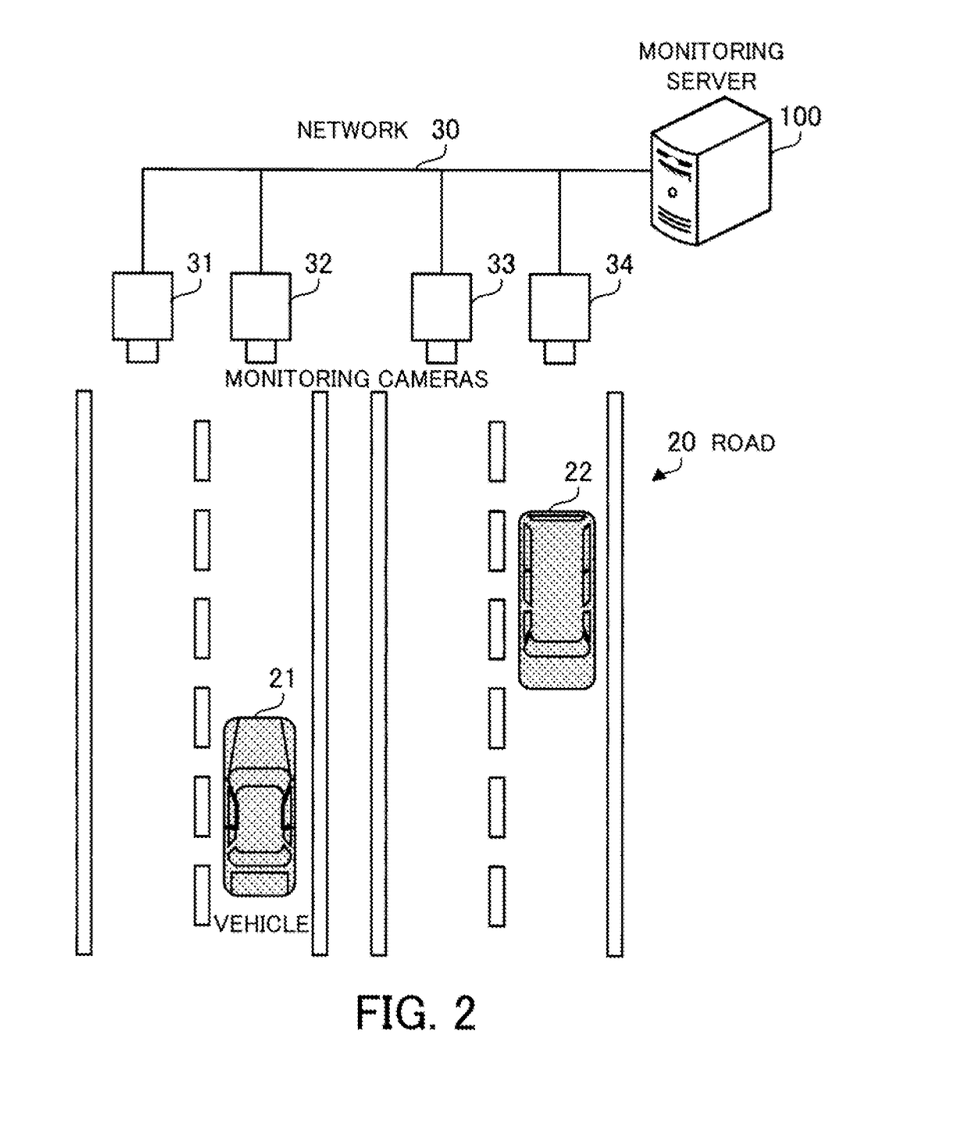
FIG. 2 depicts an example of an information processing system according to a second embodiment.

FIG. 2 depicts an example of an information processing system according to the second embodiment.

The information processing system according to the second embodiment is a traffic monitoring system that recognizes license plates of vehicles travelling on a road. As one example, this traffic monitoring system can be used by police to search for specific vehicles in criminal investigations.

The information processing system according to the second embodiment includes monitoring cameras 31 to 34 and a monitoring server 100. The monitoring server 100 corresponds to the monitoring apparatus 10 according to the first embodiment. The monitoring cameras 31 to 34 are connected via a network 30 to the monitoring server 100. The monitoring cameras 31 to 34 take images of a road 20 on which various vehicles, such as vehicles 21 and 22, are travelling. The monitoring cameras 31 to 34 take images of different positions on the road 20. As one example, the monitoring cameras 31 to 34 are installed above the road 20 so as to overlook the road 20.

The monitoring cameras 31 to 34 each continuously transmit video data via the network 30 to the monitoring server 100. The video data is an image data stream in which frames, which are images in which the road 20 appears, are arranged in a time series. The video data transmitted by the monitoring camera 31 corresponds to the data stream 16 in the first embodiment. The video data transmitted by the monitoring camera 31 corresponds to the data stream 17 in the first embodiment.

The monitoring server 100 continuously receives video data from a plurality of monitoring cameras, such as the monitoring cameras 31 to 34, and performs real-time analysis of the received video data. By performing image recognition, the monitoring server 100 recognizes the license plates of every vehicle, such as the license plates of the vehicles 21 and 22. To speed up the analysis of the video data, the monitoring server 100 uses an FPGA as a hardware accelerator.

Figure 3:
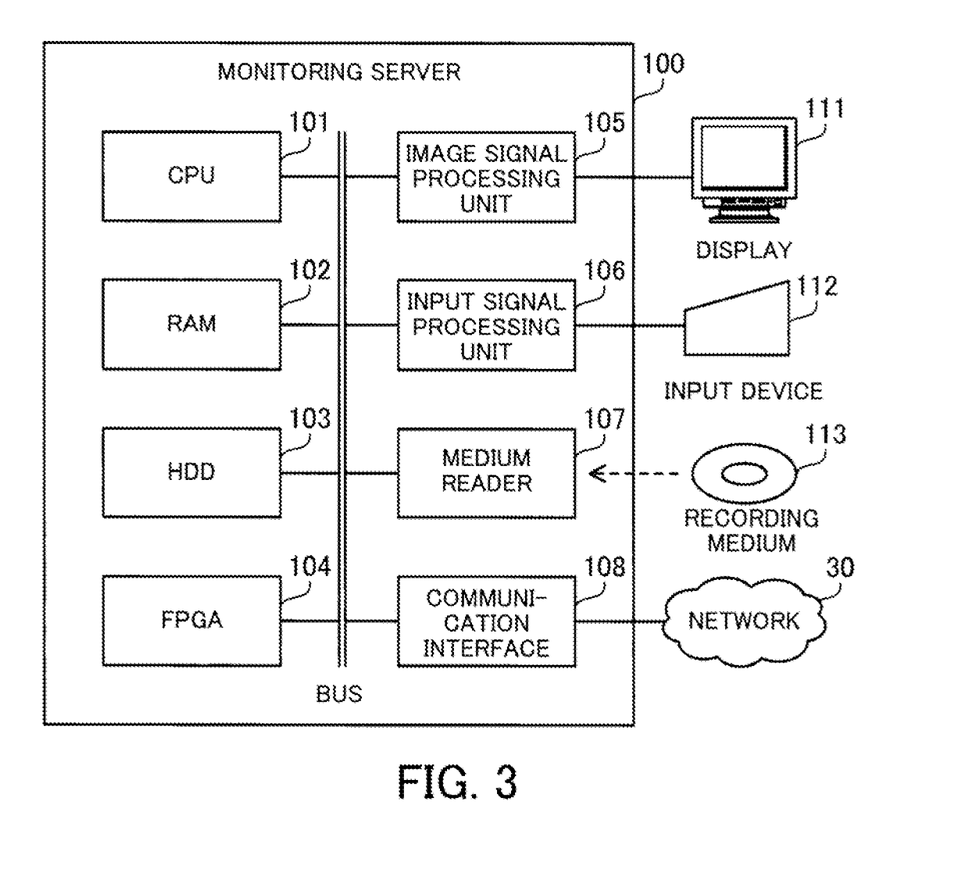
FIG. 3 is a block diagram depicting example hardware of a monitoring server.

FIG. 3 is a block diagram depicting example hardware of a monitoring server.

The monitoring server 100 includes a CPU (Central Processing Unit) 101, a RAM (Random Access Memory) 102, an HDD (Hard Disk Drive) 103, an FPGA 104, an image signal processing unit 105, an input signal processing unit 106, a medium reader 107, and a communication interface 108, which are connected to a bus.

The CPU 101 is a processor that executes instructions of a program. The CPU 101 loads at least part of a program and data stored in the HDD 103 into the RAM 102 and executes the program. Note that the CPU 101 may be equipped with a plurality of processor cores and the monitoring server 100 may be equipped with a plurality of processors. A group of a plurality of processors may be referred to as a "multiprocessor" or simply as a "processor".

The RAM 102 is a volatile semiconductor memory that temporarily stores a program to be executed by the CPU 101 and data to be used in computation by the CPU 101. Note that the monitoring server 100 may be equipped with other types of memory aside from RAM and may be equipped with a plurality of memories.

The HDD 103 is nonvolatile storage that stores software programs, such as an OS (Operating System), middleware, and application software, as well as data. Note that the monitoring server 100 may be equipped with other types of storage, such as flash memory or an SSD (Solid State Drive) and may be equipped with a plurality of storage devices.

The FPGA 104 is a programmable device whose circuit configuration can be changed afterward. The FPGA 104 includes a plurality of logic blocks that are unit blocks that convert an input signal to an output signal and a hierarchy of reconfigurable interconnects that connect the plurality of logic blocks together. In keeping with an instruction from the CPU 101, circuit information is transferred from the RAM 102 to the FPGA 104. The FPGA 104 sets the logic blocks and hierarchy of interconnects according to the circuit information to implement desired logic circuits. The FPGA 104 is capable of dynamic reconfiguration where some circuit regions are updated while other circuit regions are still operating. The FPGA 104 receives input data from the RAM 102 and processes the input data according to the circuit configuration. The processing result of the FPGA 104 is fetched by the CPU 101 from the FPGA 104 into the RAM 102.

In accordance with instructions from the CPU 101, the image signal processing unit 105 outputs images to a display 111 connected to the monitoring server 100. As the display 111, it is possible to use any type of display, such as a CRT (Cathode Ray Tube) display, an LCD (Liquid Crystal Display), or an OEL (Organic Electro-Luminescence) display.

The input signal processing unit 106 receives an input signal from an input device 112 connected to the monitoring server 100. As the input device 112, it is possible to use any type of input device, such as a mouse, a touch panel, a touch pad, or a keyboard. It is possible to connect a plurality of types of input device to the monitoring server 100.

The medium reader 107 is a reader apparatus that reads programs and/or data that have been recorded on a recording medium 113. As examples of the recording medium 113, it is possible to use a magnetic disk such as a flexible disk or an HDD, an optical disc such as a CD (Compact Disc) or a DVD (Digital Versatile Disc), a magneto-optical (MO) disc, or a semiconductor memory. As one example, the medium reader 107 saves the programs and data read out from the recording medium 113 in the RAM 102 or the HDD 103.

The communication interface 108 is connected to the network 30 and communicates via the network 30 with the monitoring cameras 31 to 34. The communication interface 108 saves reception data received from the network 30 in the RAM 102 and reads out transmission data from the RAM 102 and transmits to the network 30. The communication interface 108 is a wired communication interface connected to a cable. However, the communication interface 108 may be a wireless communication interface that performs communication on a wireless link.

Figure 4:
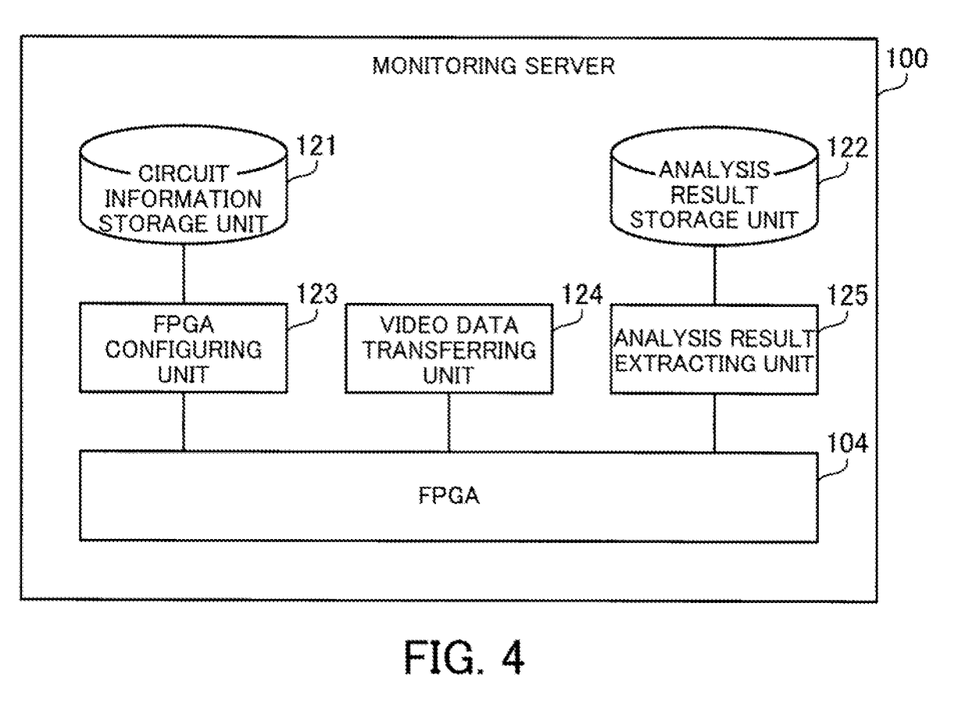
FIG. 4 is a block diagram depicting example functions of a monitoring server.

FIG. 4 is a block diagram depicting example functions of a monitoring server.

The monitoring server 100 includes a circuit information storage unit 121, an analysis result storage unit 122, an FPGA configuring unit 123, a video data transferring unit 124, and an analysis result extracting unit 125. As one example, the circuit information storage unit 121 and the analysis result storage unit 122 are implemented using storage regions of the RAM 102 or the HDD 103. Also as one example, the FPGA configuring unit 123, the video data transferring unit 124, and the analysis result extracting unit 125 are implemented using a program or programs executed by the CPU 101.

The circuit information storage unit 121 stores circuit information to be used in the FPGA 104. As one example, the circuit information includes a lookup table in which the relationship between the input signals and output signals is defined for each logic block and wiring information that defines whether each contact of crossbar switches that are the hierarchy of interconnects is on or off. The circuit information is generated in advance by the user to implement an analysis algorithm that analyzes the video data of the monitoring cameras 31 to 34. The circuit information may be generated by the monitoring server 100 or may be generated by another information processing apparatus.

The analysis result storage unit 122 stores the analysis result of video data generated by the FPGA 104. The analysis result includes license plates recognized from the video data.

The FPGA configuring unit 123 changes the circuit configuration of the FPGA 104 in accordance with an instruction from the user. The analysis algorithm that analyzes the video data is sometimes updated, such as when the installed positions of the monitoring cameras 31 to 34 have changed or when the analysis algorithm has been improved. When updating, circuit information corresponding to the new analysis algorithm is stored in the circuit information storage unit 121 and an updating request is inputted from the user. In response, the FPGA configuring unit 123 transfers the new circuit information to the FPGA 104 and inputs an updating request to the FPGA 104 to dynamically reconfigure the FPGA 104.

The video data transferring unit 124 acquires video data from the monitoring cameras 31 to 34 via the network 30 and the communication interface 108. The video data of different monitoring cameras is separately handled as different data streams. The video data transferring unit 124 continuously transfers the acquired video data of the monitoring cameras 31 to 34 to the FPGA 104.

The analysis result extracting unit 125 continuously fetches analysis results from the FPGA 104 and saves the analysis results in the analysis result storage unit 122. The analysis result extracting unit 125 compares the recognized license plates with predetermined numbers and determines whether a predetermined number has been spotted. The analysis result extracting unit 125 may output the analysis results or determination results produced using the analysis results. As one example, the analysis result extracting unit 125 outputs the analysis results or determination results to an output device of the monitoring server 100, such as displaying on the display 111. The analysis result extracting unit 125 also transmits the analysis results or determination results to another information processing apparatus.

Figure 5:
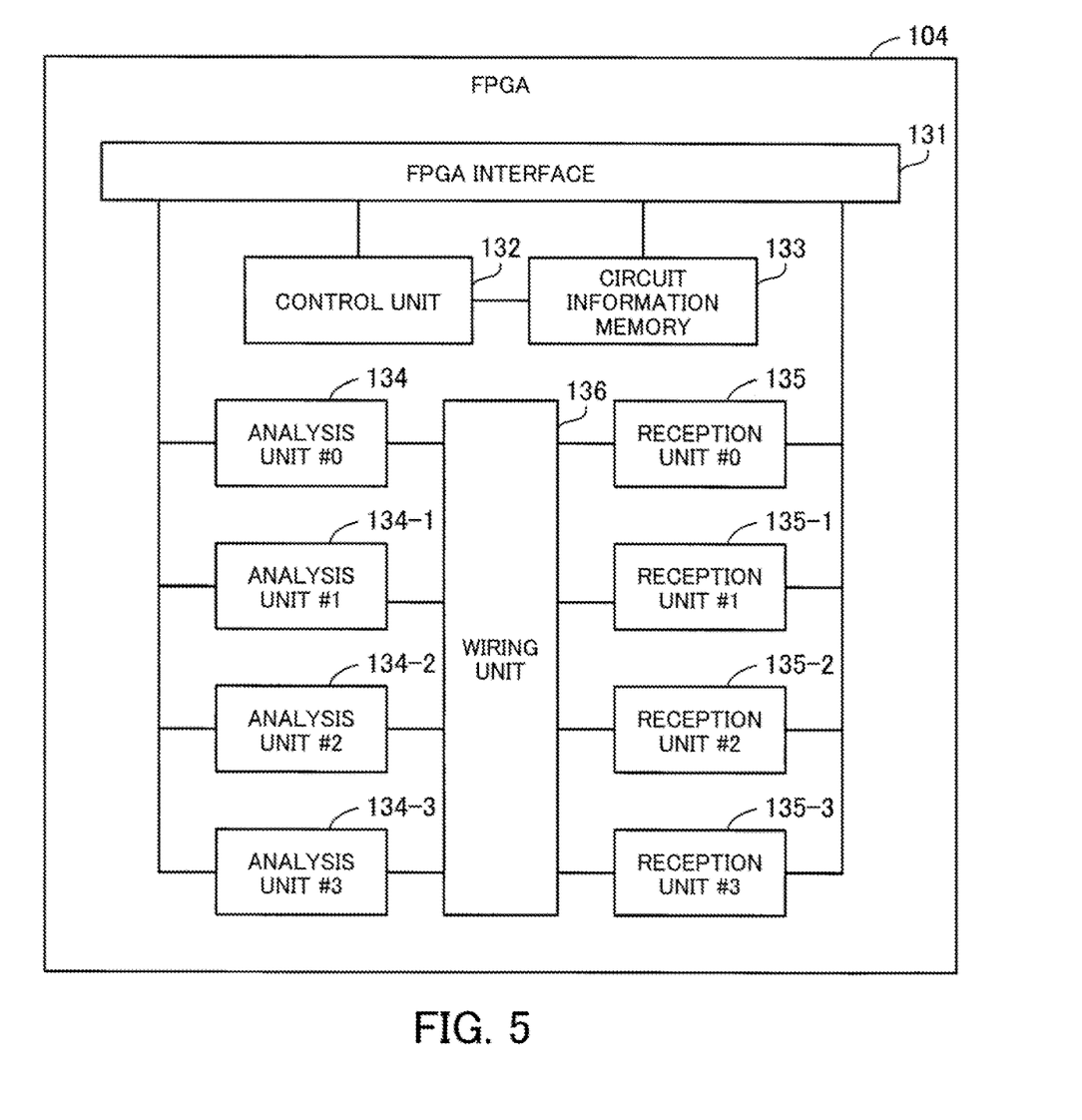
FIG. 5 is a block diagram depicting an example circuit configuration of an FPGA.

FIG. 5 is a block diagram depicting an example circuit configuration of an FPGA.

The FPGA 104 includes an FPGA interface 131, a control unit 132, a circuit information memory 133, a plurality of analysis units, a plurality of reception units, and a wiring unit 136. The plurality of analysis units include an analysis unit 134 ("analysis unit #0"), an analysis unit 134-1 ("analysis unit #1"), an analysis unit 134-2 ("analysis unit #2"), and an analysis unit 134-3 ("analysis unit #3"). The plurality of reception units include a reception unit 135 ("reception unit #0"), a reception unit 135-1 ("reception unit #1"), a reception unit 135-2 ("reception unit #2"), and a reception unit 135-3 ("reception unit #3"). The plurality of analysis units, the plurality of reception units, and the wiring unit 136 are implemented based on the circuit information.

The control unit 132 corresponds to the control unit 15 in the first embodiment. The analysis unit 134 corresponds to the analysis unit 11 in the first embodiment. The analysis unit 134-1 corresponds to the analysis unit 12 in the first embodiment. The reception unit 135 corresponds to the reception unit 13 in the first embodiment. The reception unit 135-1 corresponds to the reception unit 14 in the first embodiment.

The FPGA interface 131 is an interface that receives an input from outside the FPGA 104. The FPGA interface 131 receives circuit information and transfers the received circuit information to the circuit information memory 133. The FPGA interface 131 also receives an updating request indicating updating of one analysis unit from the CPU 101 and transfers the received updating request to the control unit 132. The FPGA interface 131 also receives video data and distributes the received video data to the reception units 135 and 135-1 to 135-3. The FPGA interface 131 also receives a fetch request indicating fetching of analysis results from the CPU 101, and fetches and outputs the analysis results from the analysis units 134 and 134-1 to 134-3 in response.

The control unit 132 controls dynamic reconfiguration of the analysis units 134 and 134-1 to 134-3. The control unit 132 receives an updating request, fetches the circuit information corresponding to the analysis algorithm after updating from the circuit information memory 133, and changes the circuit configuration of the analysis unit indicated by the updating request. The circuit information memory 133 stores circuit information for implementing the analysis units 134 and 134-1 to 134-3, the reception units 135 and 135-1 to 135-3, and the wiring unit 136.

The analysis units 134 and 134-1 to 134-3 receive one frame at a time included in the video data and execute a predetermined analysis algorithm on the inputted frame to recognize one or more license plates appearing in the inputted frame. The analysis units 134 and 134-1 to 134-3 hold an analysis result indicating the license plates, and output the held analysis result in response to a fetch request from the CPU 101.

Each of the analysis units 134 and 134-1 to 134-3 is in charge of the video data of one monitoring camera. Using the analysis units 134 and 134-1 to 134-3, it is possible to analyze the video data of different monitoring cameras in parallel. As one example, the analysis unit 134 is in charge of the video data of the monitoring camera 31, the analysis unit 134-1 is in charge of the video data of the monitoring camera 32, the analysis unit 134-2 is in charge of the video data of the monitoring camera 33, and the analysis unit 134-3 is in charge of the video data of the monitoring camera 34. To enable the CPU 101 to distinguish between the analysis results of different monitoring cameras, the analysis units 134 and 134-1 to 134-3 may append the analysis results with labels identifying the monitoring cameras.

The reception units 135 and 135-1 to 135-3 continuously receive frames of video data from the monitoring cameras 31 to 34. The reception units 135 and 135-1 to 135-3 buffer the received frames to eliminate any inconsistences in reception timing. To enable the analysis units 134 and 134-1 to 134-3 to process the frames at a fixed speed, the reception units 135 and 135-1 to 135-3 output the frames one at a time to an appropriate analysis unit via the wiring unit 136.

Each of the reception units 135 and 135-1 to 135-3 receives the video data of one monitoring camera. As one example, the reception unit 135 receives the video data of the monitoring camera 31, the reception unit 135-1 receives the video data of the monitoring camera 32, the reception unit 135-2 receives the video data of the monitoring camera 33, and the reception unit 135-3 receives the video data of the monitoring camera 34. In an initial state, the reception units 135 and 135-1 to 135-3 each output all of the received frames to one analysis unit. As examples, the reception unit 135 outputs frames to the analysis unit 134, the reception unit 135-1 outputs frames to the analysis unit 134-1, the reception unit 135-2 outputs frames to the analysis unit 134-2, and the reception unit 135-3 outputs frames to the analysis unit 134-3.

The wiring unit 136 connects the analysis units 134 and 134-1 to 134-3 and the reception units 135 and 135-1 to 135-3. The wiring of the wiring unit 136 can be changed through dynamic reconfiguration using the circuit information. The initial state at least includes the analysis unit 134 and the reception unit 135 being connected by a wire, the analysis unit 134-1 and the reception unit 135-1 being connected by a wire, the analysis unit 134-2 and the reception unit 135-2 being connected by a wire, and the analysis unit 134-3 and the reception unit 135-3 being connected by a wire. However, the wiring unit 136 may be implemented in advance so that each reception unit is connected to every analysis unit. With this arrangement, it is possible to suppress subsequent changes to the wiring.

Here, to change the analysis algorithm, it would be conceivable to perform an update by dynamically reconfiguring one of the analysis units of the FPGA 104. There are cases where several seconds to around fifteen seconds are taken to update one analysis unit. When the analysis unit to be updated is in charge of the video data of any one of the monitoring cameras, stopping and updating that analysis unit with no other preparations will result in the analysis of the video data of that monitoring camera completely stopping during updating. By doing so, there is an increase in the risk of missing a license plate to be found, resulting in a drop in monitoring accuracy.

For this reason, the FPGA 104 according to the second embodiment performs a sampling process on the image data to prevent, within the initial extent of hardware resources, video data of a monitoring camera from being left completely unanalyzed during updating, thereby suppressing a drop in monitoring accuracy.

Figure 6:
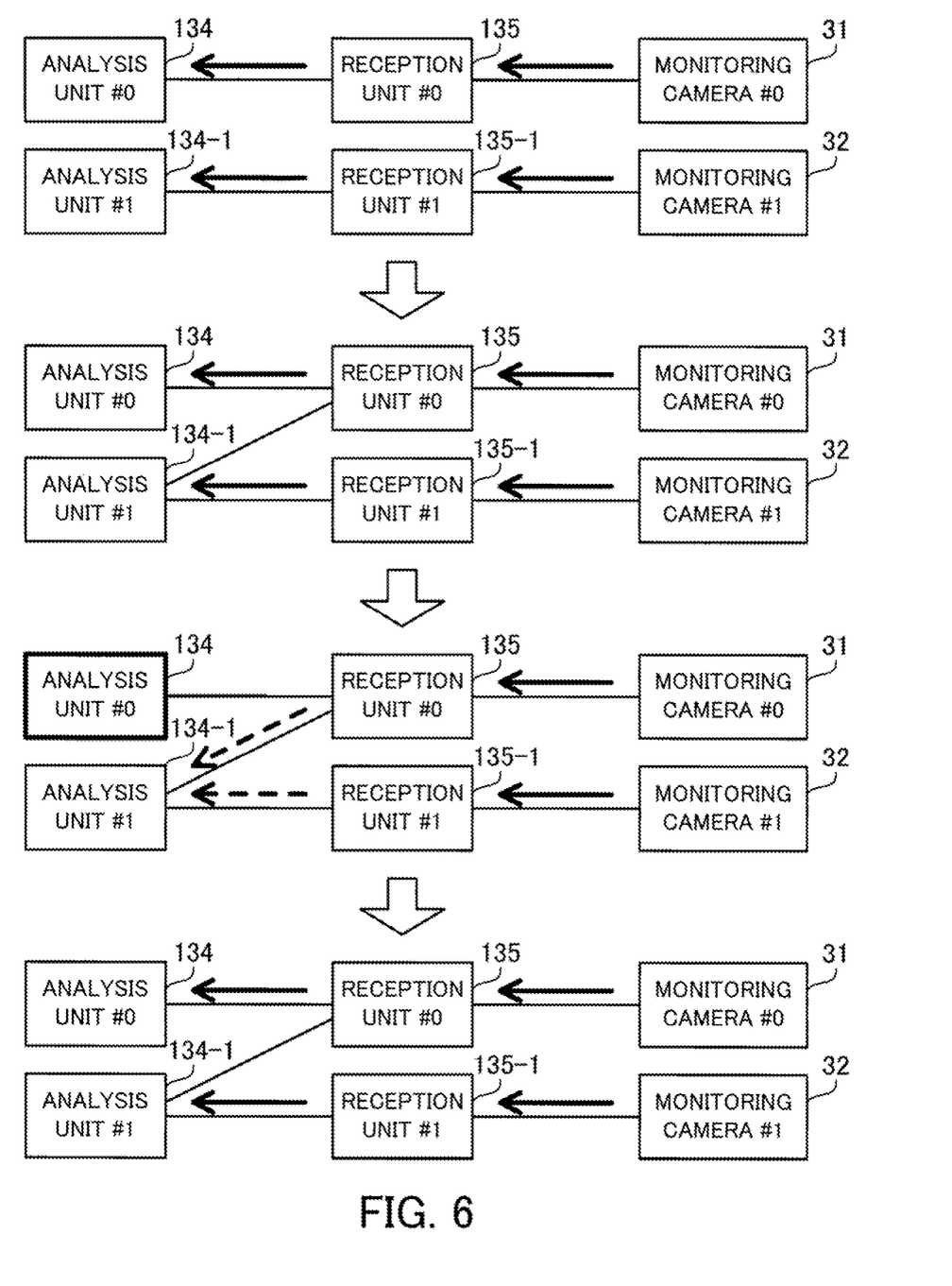
FIG. 6 depicts a first example of reconfiguration of an FPGA.

FIG. 6 depicts a first example of reconfiguration of an FPGA.

To simplify the explanation, a case is considered here where images of the road 20 are taken by two monitoring cameras 31 and 32 and two analysis units 134 and 134-1 are used to analyze the video data of the monitoring cameras 31 and 32 in parallel.

In the normal operation, the reception unit 135 successively receives frames of video data from the monitoring camera 31 and the reception unit 135-1 successively receives frames of video data from the monitoring camera 32. The reception unit 135 outputs the received frames of the monitoring camera 31 one at a time to the analysis unit 134 without performing a sampling process. The analysis unit 134 analyzes the inputted frame. The reception unit 135-1 outputs the received frames of the monitoring camera 32 one at a time to the analysis unit 134-1 without performing a sampling process. The analysis unit 134-1 analyzes the inputted frame.

When an updating request indicating updating of the analysis unit 134 has been issued by the CPU 101, the control unit 132 adds a wire between the reception unit 135, which corresponds to the analysis unit 134 to be updated, and the analysis unit 134-1 that is not to be updated.

However, when a wire already exists between the reception unit 135 and the analysis unit 134-1, no wire needs to be added. The control unit 132 then indicates a change in the frame outputting method to the reception unit 135, which corresponds to the analysis unit 134 to be updated, and to the reception unit 135-1, which corresponds to the analysis unit 134-1 that is not to be updated. This change in the frame outputting method is performed for example by providing a parameter, which controls the operation of the reception units 135 and 135-1, inside or outside the reception units 135 and 135-1 and the control unit 132 rewriting the parameter.

The reception unit 135-1 corresponding to the analysis unit 134-1 that is not to be updated performs the sampling process on the video data of the monitoring camera 32. The sampling process reduces the amount of output data per unit time by deleting part of the video data and outputting the remaining data. As described later, frame sampling that deletes frames at fixed intervals from a plurality of consecutive frames and region sampling that deletes image regions that form part of each frame are given as examples of the sampling process. The reception unit 135-1 outputs the frames of the monitoring camera 32 after the sampling process to the analysis unit 134-1. When frame sampling is performed, the frames that were not deleted by the sampling process are inputted one at a time into the analysis unit 134-1. At the timing of the deleted frames, nothing is outputted from the reception unit 135-1 to the analysis unit 134-1.

The reception unit 135 corresponding to the analysis unit 134 to be updated stops outputting frames to the analysis unit 134 to be updated. The reception unit 135 instead outputs the frames of the monitoring camera 31 to the analysis unit 134-1 that is not to be updated. However, since frames from the reception unit 135-1 also flow to the analysis unit 134-1, it is not possible for the analysis unit 134-1 to process all of the frames of the monitoring camera 31. For this reason, the reception unit 135 also performs a sampling process.

When the reception unit 135-1 performs frame sampling, the reception unit 135 also performs frame sampling on the video data of the monitoring camera 31. The reception unit 135 outputs the frames that were not deleted by the sampling process one at a time to the analysis unit 134-1. The timing at which the reception unit 135 outputs frames is the timing at which the reception unit 135-1 does not output frames. As one example, the reception unit 135 and the reception unit 135-1 delete frames at a ratio of one frame in two and alternately output frames that were not deleted to the analysis unit 134-1.

When the reception unit 135-1 performs region sampling, the reception unit 135 also performs region sampling on the video data of the monitoring camera 31. The reception units 135 and 135-1 both output image regions that where not deleted by the sampling process to the analysis unit 134-1. A combined image produced by combining the image region outputted by the reception unit 135 and the image region outputted by the reception unit 135-1 is handled as a single frame. As one example, the reception unit 135 and the reception unit 135-1 both extract image regions that are half of the original frames in size and output the extracted image regions to the analysis unit 134-1.

Once the frame outputting method of the reception units 135 and 135-1 has been changed, the control unit 132 updates the analysis unit 134 using the circuit information indicating the analysis algorithm to be used after the change. When updating the analysis unit 134, as one example, a lookup table used in logic blocks included in the analysis unit 134 and/or the wiring inside the analysis unit 134 is/are updated.

When the updating of the analysis unit 134 is complete, the control unit 132 instructs the reception unit 135 corresponding to the analysis unit 134 that was updated and the reception unit 135-1 corresponding to the analysis unit 134-1 that was not to be updated to restore the frame outputting method. Restoring the frame outputting method is performed for example by providing a parameter that controls the operation of the reception units 135 and 135-1 inside or outside the reception units 135 and 135-1 and the control unit 132 rewriting the parameter.

After the frame outputting method is restored, the reception unit 135 outputs the received frames of the monitoring camera 31 one at a time to the analysis unit 134 without performing a sampling process. The reception unit 135-1 outputs the received frames of the monitoring camera 32 one at a time to the analysis unit 134-1 without performing a sampling process. The wire between the reception unit 135 and the analysis unit 134-1 may be left without being deleted. However, it is also possible for the control unit 132 to delete the wire between the reception unit 135 and the analysis unit 134-1.

By performing this procedure, it is possible to update the analysis algorithm of the analysis unit 134 while operation of the FPGA 104 continues. During updating of the analysis unit 134, both the video data of the monitoring camera 31 and the video data of the monitoring camera 32 will be analyzed at least partially. Accordingly, the risk of missing a license plate to be spotted is reduced, which improves the monitoring accuracy. It is also possible to continue analyzing the video data within the initial extent of the hardware resources of the analysis unit 134 and 134-1 and therefore there is no need to provide a spare analysis unit that is not used during normal operation.

Next, a case where many analysis units are in use will be considered, that is, when there are many video data streams to be analyzed in parallel. It is assumed here that N analysis units (where N is an integer of two or more) are used in normal operation and that non-negative integer identification numbers 0, 1, 2, . . . have been assigned to the analysis units. It is further assumed that the frames included in the video data received from the N monitoring cameras can be identified by non-negative integer identification numbers 0, 1, 2, . . . using a certain time point as a reference and that the frame timing is synchronized in the N reception units corresponding to the N analysis units.

When frame sampling is used, the ith reception unit (where i=0, 1, 2, . . . ) out of the N reception units may delete the ith frame out of every N consecutive frames (frames for which dividing the non-negative integer identification number by N leaves a remainder of i). Reception units corresponding to analysis units that are not to be updated output N−1 frames that were not deleted out of N consecutive frames to the corresponding analysis unit. Meanwhile, the reception unit corresponding to the analysis unit that is to be updated distributes N−1 frames that were not deleted out of N consecutive frames to the N−1 analysis units that are not to be updated.

The ith analysis unit that is not to be updated does not receive a frame from the corresponding reception unit at the ith frame timing. This means that the reception unit corresponding to the analysis unit to be updated may output the ith frame that was not deleted to the ith analysis unit. By doing so, frames are inputted at the same speed as before into the N−1 analysis units that are not to be updated.

When region sampling is performed, the ith reception unit out of the N reception units may delete a 1/N sized image region from each frame. The reception units corresponding to the analysis units that are not to be updated output (N−1)/N sized image regions that were not deleted to the corresponding analysis units. Meanwhile, the reception unit corresponding to the analysis unit to be updated distributes the remaining (N−1)/N sized image region to the N−1 analysis units that are not to be updated. Here, the remaining (N−1)/N sized image region may be divided into N−1 equal parts. The speed at which the respective reception units output frames is the same as before the sampling process. The analysis units that are not to be updated receive an input of the (N−1)/N sized image region and the 1/N sized image region and combine the two image regions. As a result, a frame that is the same size as before the sampling process is inputted into the N−1 analysis units that are not to be updated.

Figure 7:
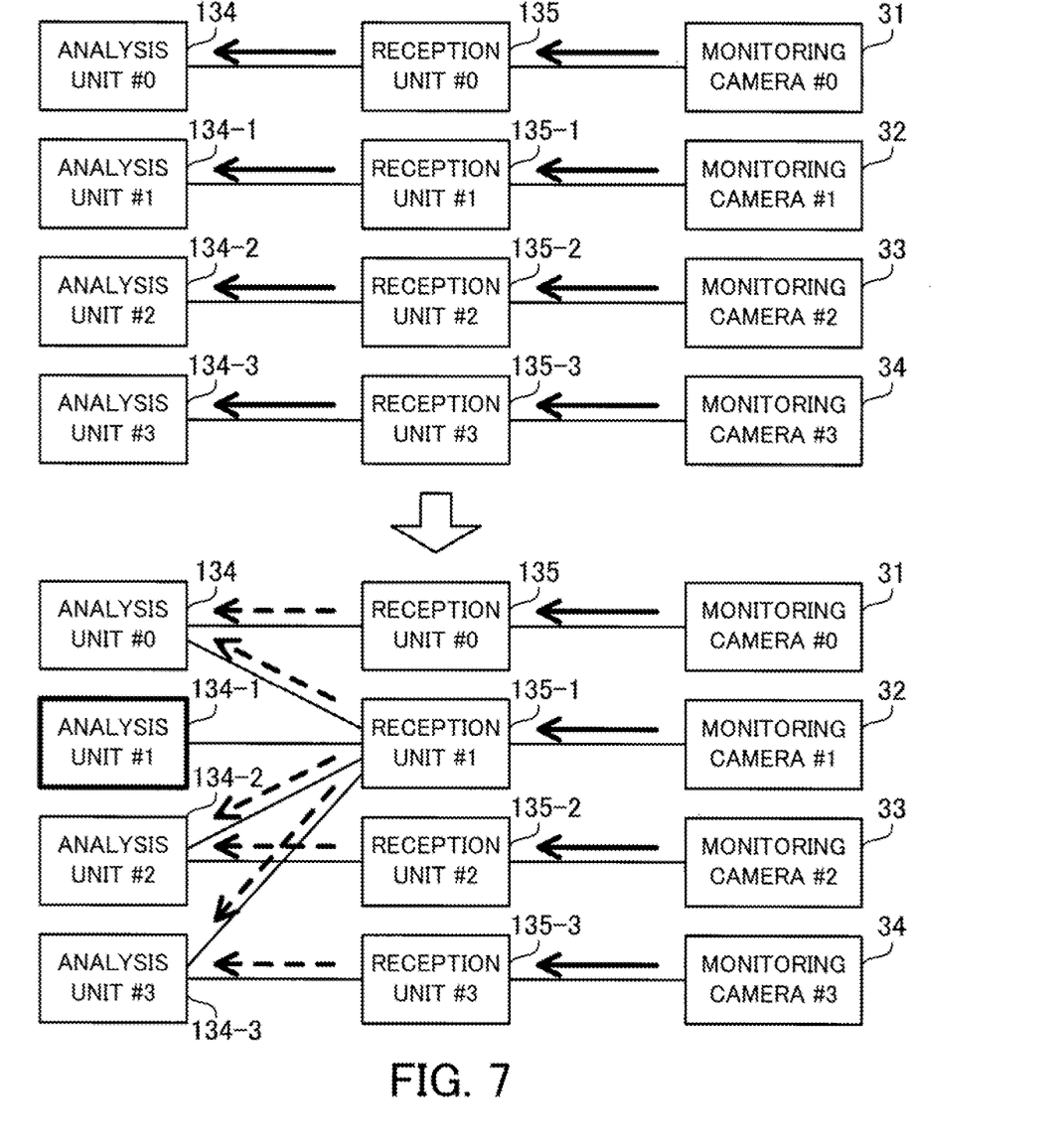
FIG. 7 depicts a second example of reconfiguration of an FPGA.

FIG. 7 depicts a second example of reconfiguration of an FPGA.

During normal operation, the reception unit 135 successively receives frames of video data from the monitoring camera 31. The reception unit 135-1 successively receives frames of video data from the monitoring camera 32. The reception unit 135-2 successively receives frames of video data from the monitoring camera 33. The reception unit 135-3 successively receives frames of video data from the monitoring camera 34.

The reception unit 135 outputs received frames of the monitoring camera 31 one at a time to the analysis unit 134 without performing a sampling process. The reception unit 135-1 outputs received frames of the monitoring camera 32 one at a time to the analysis unit 134-1 without performing a sampling process. The reception unit 135-2 outputs received frames of the monitoring camera 33 one at a time to the analysis unit 134-2 without performing a sampling process. The reception unit 135-3 outputs received frames of the monitoring camera 34 one at a time to the analysis unit 134-3 without performing a sampling process.

When an updating request indicating updating of the analysis unit 134-1 has been issued by the CPU 101, the control unit 132 adds wires between the reception unit 135-1, which corresponds to the analysis unit 134-1 to be updated, and the analysis units 134, 134-2, and 134-3 that are not to be updated. However, when wires already exist, no wires need to be added. The control unit 132 then instructs the reception units 135 and 135-1 to 135-3 to change the frame outputting method.

The reception unit 135 performs a sampling process on the video data of the monitoring camera 31 to reduce the amount of data to be outputted to the analysis unit 134 by ¼. When frame sampling is performed, the reception unit 135 deletes the 0th frame out of four consecutive frames. When region sampling is performed, the reception unit 135 deletes an image region that is ¼ of a frame in size from every frame. In the same way, the reception unit 135-2 performs a sampling process on the video data of the monitoring camera 33 to reduce the amount of data to be outputted to the analysis unit 134-2 by ¼. When frame sampling is performed, the reception unit 135-2 deletes the 2nd frame out of four consecutive frames. When region sampling is performed, the reception unit 135-2 deletes an image region that is ¼ of a frame in size from every frame. The reception unit 135-3 performs a sampling process on the video data of the monitoring camera 34 to reduce the amount of data to be outputted to the analysis unit 134-2 by ¼. When frame sampling is performed, the reception unit 135-3 deletes the 3rd frame out of four consecutive frames. When region sampling is performed, the reception unit 135-3 deletes an image region that is ¼ of a frame in size from every frame.

The reception unit 135-1 distributes ¼ of the video data of the monitoring camera 32 to each of the analysis units 134, 134-2, and 134-3 and deletes the remaining ¼. When frame sampling is performed, the reception unit 135-1 outputs the 0th frame out of four consecutive frames to the analysis unit 134, deletes the first frame, outputs the 2nd frame to the analysis unit 134-2, and outputs the 3rd frame to the analysis unit 134-3. When region sampling is performed, the reception unit 135-1 outputs different image regions that are ¼ of the size of each frame to the analysis units 134, 134-2, and 134-3 and deletes the remaining ¼ sized image region.

Note that when N analysis units are used in normal operation as described above, the video data corresponding to the analysis unit to be updated is distributed to N−1 analysis units. That is, every analysis unit that is not to be updated is used to process the video data which the analysis unit to be updated is in charge of, thereby maximizing the number of units to which data is distributed. On the other hand, it is also possible to use only some of the analysis units that are not to be updated to process the video data which the analysis unit to be updated is in charge of.

As examples, it is possible for the user to decide in advance the number of analysis units to which data is to be distributed, or to use a fixed proportion of the number of analysis units that are used during normal operation. When data is distributed to only some of the analysis units that are not to be updated, the analysis units to which data is distributed may be selected at random or predetermined analysis units corresponding to predetermined monitoring cameras may be selected. It is also possible to decide the analysis units to which data is to be distributed according to a predetermined rule. As one example, it is possible to select analysis units with identification numbers before and after the analysis unit to be updated, such as by selecting the (I−1)th analysis unit and the (I+1)th analysis unit when updating the Ith analysis unit. The control unit 132 may monitor the load of each analysis unit and preferentially select analysis units with low loads as analysis units to which data is to be distributed.

Next, examples of frame sampling and region sampling will be described.

Figure 8:
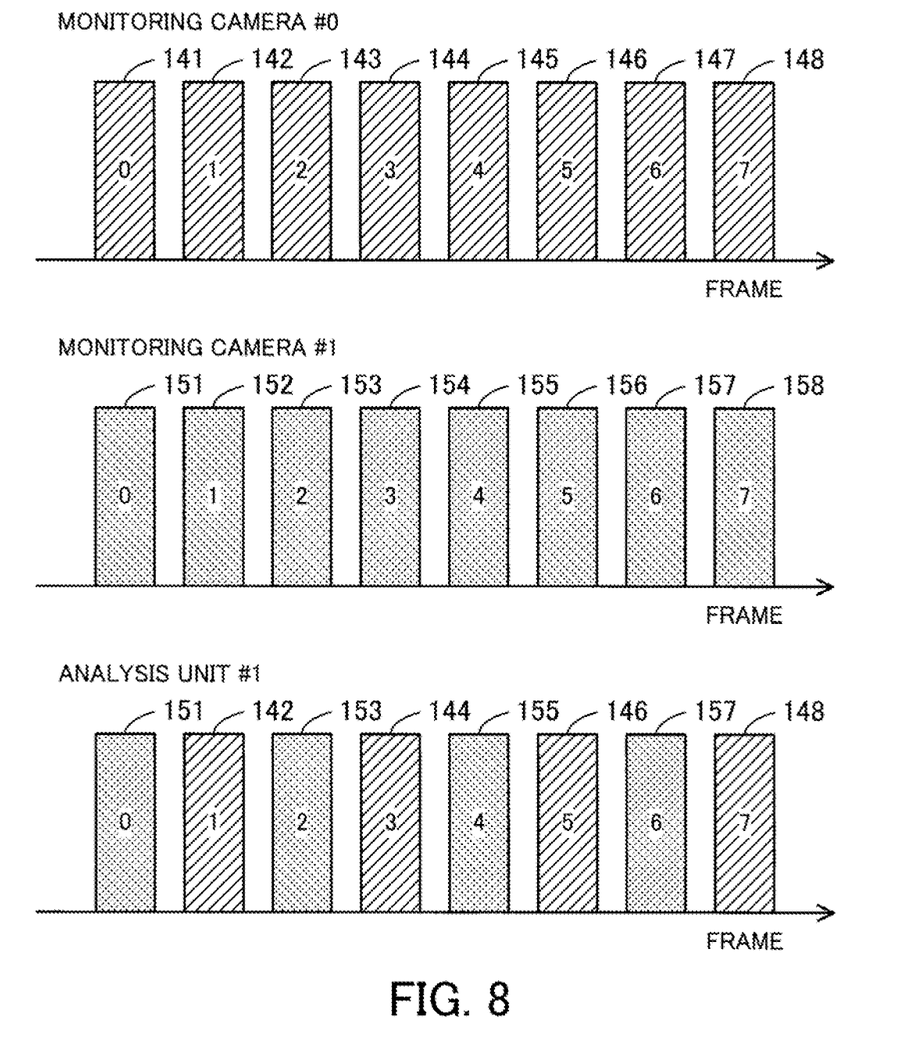
FIG. 8 depicts a first example of sampling of video data.

FIG. 8 depicts a first example of sampling of video data.

To simplify the explanation, in the same way as FIG. 6, a case is considered where images of the road 20 are taken by two monitoring cameras 31 and 32 and the two analysis units 134 and 134-1 analyze the video data of the monitoring cameras 31 and 32 in parallel.

The reception unit 135 successively receives frames 141 to 148 ("frames #0 to #7") from the monitoring camera 31. The reception unit 135-1 successively receives frames 151 to 158 ("frames #0 to #7") from the monitoring camera 32. When frame sampling is performed as the sampling process, the reception unit 135 deletes the 0th frame out of two consecutive frames and outputs the 1st frame to the analysis unit 134-1. Accordingly, frames 142, 144, 146, and 148 are outputted out of the frames 141 to 148 of the monitoring camera 31 from the reception unit 135 to the analysis unit 134-1. Meanwhile, the reception unit 135-1 deletes the 1st frame out of two consecutive frames and outputs the 0th frame to the analysis unit 134-1. Accordingly, frames 151, 153, 155, and 157 are outputted out of the frames 151 to 158 of the monitoring camera 32 from the reception unit 135-1 to the analysis unit 134-1.

Figure 9:
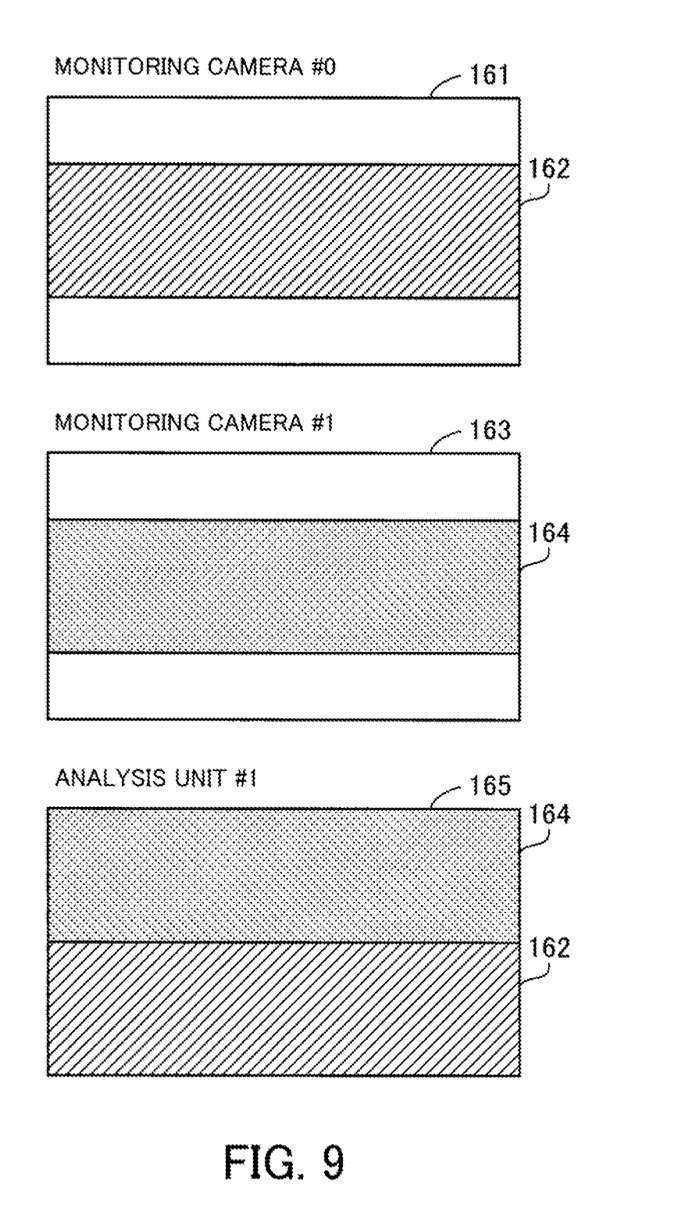
FIG. 9 depicts a second example of sampling of video data.

FIG. 9 depicts a second example of sampling of video data.

The reception unit 135 receives a frame 161 from the monitoring camera 31. The reception unit 135-1 receives a frame 163 from the monitoring camera 32. When performing region sampling as the sampling process, the reception unit 135 extracts an image region 162 that is half the size of the frame 161 from the center of the frame 161. As one example, when the size of the frame 161 is 1920 horizontal pixels by 1080 vertical pixels, the image region 162 is an image region of 1920 horizontal pixels by 540 vertical pixels in the center of the frame 161. In the same way, the reception unit 135-1 extracts an image region 164 that is half the size of the frame 163 from the center of the frame 163.

The reception unit 135 outputs the image region 162 to the analysis unit 134-1 and the reception unit 135-1 outputs the image region 164 to the analysis unit 134-1. The analysis unit 134-1 places the image region 162 below the image region 164 to combine the image regions and generate a frame 165. The frame 165 has the same size as the frames 161 and 163. The analysis unit 134-1 regards the generated frame 165 as an inputted frame and performs image recognition for license plates.

Note that although upper and lower parts of frames are deleted and a plurality of image regions are combined in the vertical direction in the above description, it is also possible to delete left and right parts of frames and combine a plurality of image regions in the horizontal direction. Also, although an image region in the center of each frame is extracted in the above description, it is also possible to extract a non-central image region, such as an upper half, lower half, left half, or right half of each frame.

Although the extraction position is the same for the frame 161 of the monitoring camera 31 and the frame 163 of the monitoring camera 32 in the above description, it is also possible to change the extraction position according to the monitoring camera. As one example, an image region that is the upper half or left half may be extracted from the frame 161 of the monitoring camera 31 and an image region that is the lower half or right half may be extracted from the frame 163 of the monitoring camera 32. Also, although the extraction position is fixed for all frames in the above description, the extraction position may change depending on individual frames. As one example, it is possible to extract the upper half of the 0th frame, the lower half of the 1st frame, the left half of the 2nd frame, and the right half of the 3rd frame.

Figure 10:
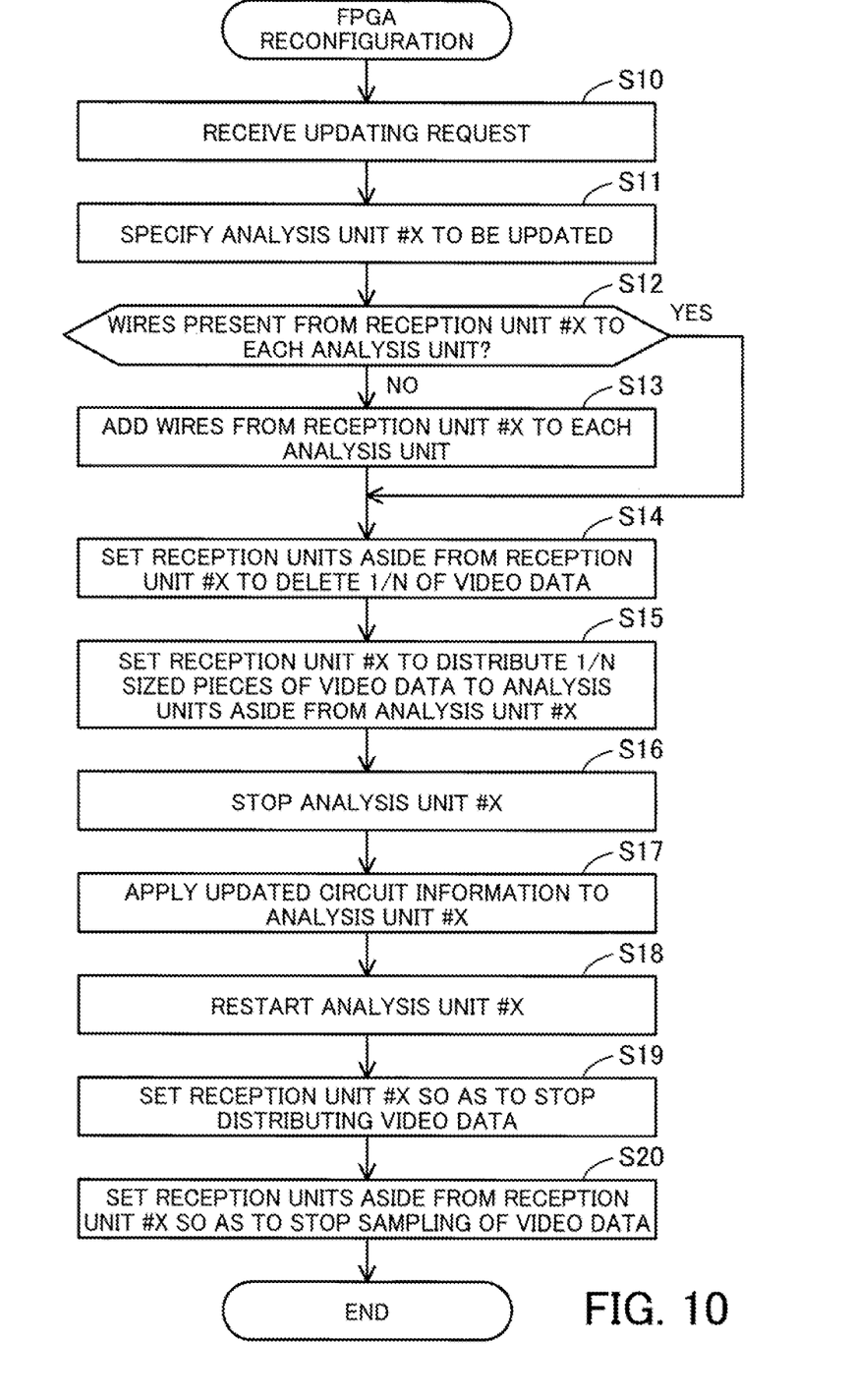
FIG. 10 is a flowchart depicting an example procedure that reconfigures an FPGA.

Next, the processing procedure of the FPGA 104 will be described.

FIG. 10 is a flowchart depicting an example procedure that reconfigures an FPGA.

(S10) The control unit 132 receives an updating request indicating updating of one analysis unit. Here, circuit information to be applied to the analysis unit to be updated has already been written in the circuit information memory 133.

(S11) The control unit 132 specifies the analysis unit #X to be updated that is designated by the updating request.

(S12) The control unit 132 determines whether wires from a reception unit #X corresponding to the analysis unit #X to be updated to other analysis units that are not to be updated already exist. When there are such wires, the processing proceeds to step S14, while when there are no such wires, the processing proceeds to step S13.

(S13) The control unit 132 updates the wiring unit 136 to add wires from the reception unit #X corresponding to the analysis unit #X to be updated to other analysis units that are not to be updated.

(S14) The control unit 132 sets the reception units aside from the reception unit #X, that is, the reception units corresponding to analysis units that are not to be updated, so as to remove 1/N of the video data received by those reception units. As one example, a setting is made to remove one in every N frames received by that reception unit.

(S15) The control unit 132 sets the reception unit #X corresponding to the analysis unit #X to be updated so as to distribute 1/N pieces of video data to the analysis units aside from the analysis unit #X. As one example, a setting is made to output one out of N frames received by the reception unit #X to each analysis unit aside from the analysis unit #X.

(S16) The control unit 132 stops the analysis unit #X to be updated.

(S17) The control unit 132 fetches the updated circuit information from the circuit information memory 133 and applies the fetched circuit information to the analysis unit #X. That is, by performing dynamic reconfiguration, the control unit 132 rewrites the circuit region of the analysis unit #X based on the fetched circuit information.

(S18) The control unit 132 restarts the updated analysis unit #X.

(S19) The control unit 132 sets the reception unit #X corresponding to the updated analysis unit #X so that the reception unit #X stops distributing the received video data. By doing so, the reception unit #X outputs all of the received frames to the analysis unit #X.

(S20) The control unit 132 sets the reception units aside from the reception unit #X, that is, the reception units corresponding to analysis units that were not to be updated so as to stop the sampling process on the video data received by those reception units. As a result, the reception units output frames without a sampling process.

With the monitoring server 100 according to the second embodiment, when a specified analysis unit is updated, a sampling process is performed on the video data of a plurality of monitoring cameras and excess capacity produced by the sampling process is used to analyze video data of the monitoring camera whose analysis unit is being updated. By doing so, it is possible to continue analysis of the video data of a plurality of monitoring cameras even when the analysis algorithm is being updated. It is also possible to avoid a situation where none of the video data of a monitoring camera whose analysis unit is being updated is analyzed during updating. Also, video data is at least partially analyzed for every monitoring camera in a plurality of monitoring cameras. Accordingly, it is possible to reduce the risk of missing a monitoring target in the video data and to improve the monitoring accuracy. It is also possible to continue analyzing the video data of a plurality of monitoring cameras within the initial extent of the hardware resources. Accordingly, there is no need to provide a spare analysis unit that is not used during normal operation, making it possible to suppress the circuit scale and cost.

According to the present embodiments, it is possible to suppress interruption of data stream analysis when updating an analysis unit.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A monitoring apparatus comprising:
a first analyzing circuit and a second analyzing circuit that analyze inputted data;
a first receiver circuit that receives data of a first image data stream generated by a first camera device and outputs the received data of the first image data stream to the first analyzing circuit;
a second receiver circuit that receives data of a second image data stream generated by a second camera device and outputs the received data of the second image data stream to the second analysis unit analyzing circuit; and
a controller circuit configured to instruct, when an updating request indicating updating of the first analyzing circuit has been received, the second receiver circuit to perform a sampling process on the second image data stream and output data after the sampling process, to change an output destination of the first receiver circuit so that the data of the first image data stream is at least partially outputted to the second analyzing circuit, and to re-change the output destination so that the data of the first image data stream generated by the first camera device is outputted to the first analyzing circuit after the updating is completed.

2. The monitoring apparatus according to claim 1, wherein each of the first image data stream and the second image data stream includes a plurality of frames and the sampling process includes deleting some frames out of the plurality of frames in the first image data stream and the second image data stream.

3. The monitoring apparatus according to claim 1, wherein each of the first image data stream and the second image data stream includes a plurality of frames and the sampling process includes deleting an image region that forms part of each frame in first image data stream and the second image data stream.

4. The monitoring apparatus according to claim 1, wherein the first analyzing circuit, the second analyzing circuit, the first receiver circuit, and the second receiver circuit are implemented on a programmable device and changing the output destination includes adding a wire between the first receiver circuit and the second analyzing circuit.

5. The monitoring apparatus according to claim 1,
wherein instructing the second receiver circuit includes causing a reduction by a predetermined ratio in the data of the second image data stream that is to be outputted from the second receiver circuit to the second analyzing circuit, and
changing the output destination includes stopping an outputting of the data of the first image data stream from the first receiver circuit to the first analyzing circuit and outputting the data of the first image data stream at the predetermined ratio from the first receiver circuit to the second analyzing circuit.

6. The monitoring apparatus according to claim 5, comprising:
a plurality of analyzing circuits, which include the first analyzing circuit and the second analyzing circuit, and a plurality of receiver circuits, which include the first receiver circuit and the second receiver circuit and correspond to the plurality of analyzing circuits,
wherein the predetermined ratio is determined according to a number of the analyzing circuits.

7. A monitoring method comprising:
outputting, by a monitoring apparatus including a first analyzing circuit, a second analyzing circuit, a first receiver circuit, and a second receiver circuit, data of a first image data stream generated by a first camera device, which has been received by the first receiver circuit, from the first receiver circuit to the first analyzing circuit;
outputting, by the monitoring apparatus, data of a second image data stream generated by a second camera device, which has been received by the second receiver circuit, from the second receiver circuit to the second analyzing circuit;
instructing, by the monitoring apparatus when an updating request for updating the first analyzing circuit has been received, the second receiver circuit to perform a sampling process on the second image data stream and to output data after the sampling process, and changing an output destination of the first receiver circuit so that the data of the first image data stream is at least partially outputted to the second analyzing circuit; and
re-changing, by the monitoring apparatus, the output destination so that the data of the first image data stream generated by the first camera device is outputted to the first analyzing circuit after the updating is completed.

8. A non-transitory computer-readable recording medium storing therein a computer program that causes a computer to execute a process comprising:
outputting data of a first data image stream generated by a first camera device, which has been received by a first receiver circuit of the computer, from the first receiver circuit to a first analyzing circuit of the computer;
outputting data of a second image data stream generated by a second camera device, which has been received by a second receiver circuit of the computer, from the second receiver circuit to a second analyzing circuit of the computer;
instructing, when an updating request indicating updating of the first analyzing circuit has been received, the second receiver circuit to perform a sampling process on the second image data stream and output data after the sampling process, and changing an output destination of the first receiver circuit so that the data of the first image data stream is at least partially outputted to the second analysis unit analyzing circuit; and
re-changing the output destination so that the data of the first image data stream generated by the first camera device is outputted to the first analyzing circuit after the updating is completed.

* * * * *